Figure 1:
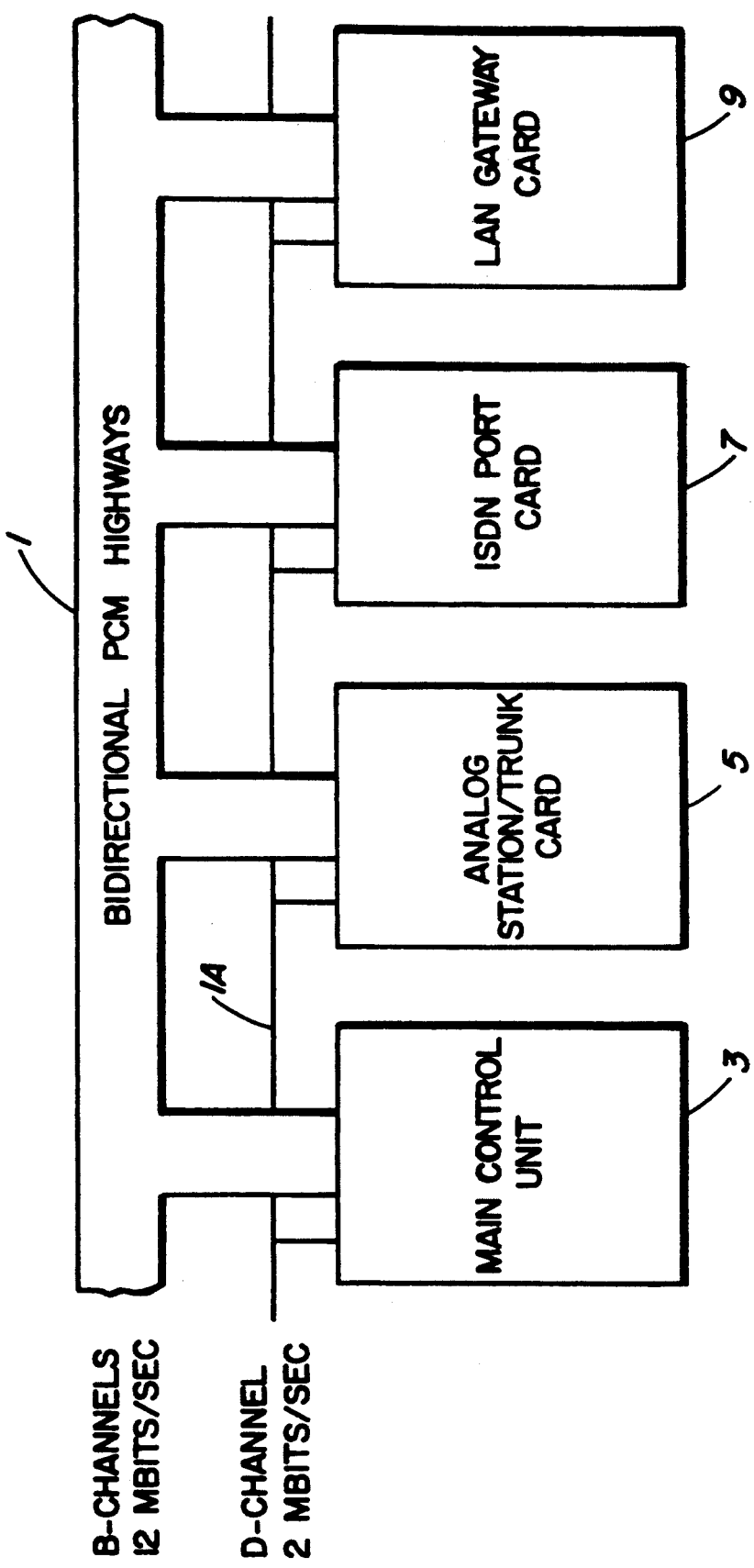

United States Patent [19]

Hatherill et al.

[11] Patent Number: 5,202,883
[45] Date of Patent: Apr. 13, 1993

[54] DIGITAL KEY STYSTEM ARCHITECTURE

[75] Inventors: Richard A. Hatherill; Bernard J. Trudel, both of Ottawa; Mark R. Coomber, Kanata; William C. Mitchell, Arnprior, all of Canada

[73] Assignee: Mitel Corporation, Ontario, Canada

[21] Appl. No.: 386,697

[22] Filed: Jul. 31, 1989

[30] Foreign Application Priority Data

Aug. 2, 1988 [CA] Canada .................................. 573618

[51] Int. Cl.$^5$ ........................................ H04G 11/04
[52] U.S. Cl. ........................................ 370/67; 370/85.1
[58] Field of Search ............... 370/85.1, 85.13, 85.11, 370/85.9, 67

[56] References Cited

U.S. PATENT DOCUMENTS

| | | | |
|---|---|---|---|
| 4,387,425 | 6/1983 | El-Gohary | 370/85.1 |
| 4,554,658 | 11/1985 | Marten et al. | 370/85.1 |
| 4,581,733 | 4/1986 | Sarson et al. | 370/85.1 |
| 4,608,700 | 8/1986 | Kirtley, Jr. et al. | 370/85.11 |
| 4,740,955 | 4/1988 | Litterer et al. | 370/85.11 |
| 4,787,081 | 11/1988 | Waters et al. | 370/67 |
| 4,791,629 | 12/1988 | Burns et al. | 370/85.13 |
| 4,823,338 | 4/1989 | Chan et al. | 370/85.1 |
| 4,908,823 | 3/1990 | Haagens et al. | 370/85.1 |

OTHER PUBLICATIONS

Computer Networks by Andrew S. Tanenbaum, 2nd edition, 1988 by Prentice-Hall, Inc. Sec., Sec. 4.7.1, pp. 254–255.

Primary Examiner—Douglas W. Olms
Assistant Examiner—Wellington Chin
Attorney, Agent, or Firm—Antonelli, Terry, Stout & Kraus

[57] ABSTRACT

A digital communication system having a universal backplane bus and a plurality of interface circuits connected to remote peripherals, for effecting bidirectional communication of information signals between the remote peripherals via the bus, as well as the exchange of message signals between local control circuitry resident on individual ones of the interface circuits. Each interface circuit has a digital time and space switch for transmitting the information signals in PCM format between the remote peripherals and the universal bus, under control of the control circuitry resident on respective ones of the interface circuits. An HDLC controller is provided on each of the interface circuits for controlling the exchange of message signals between the local control circuitry resident on the respective ones of the interface circuits.

11 Claims, 4 Drawing Sheets

DIGITAL KEY STYSTEM ARCHITECTURE

This invention relates in general to communication systems, and more particularly to a digital telephone system utilizing distributed processing and switching.

An important objective in modern day telecommunications is to solve the problem of linking together a number of telephone users and data communication devices. The solution to this problem involves implementing circuitry for providing a transmission and switching function, as well as circuitry for providing a signaling and control function.

Prior art digital (PCM) telephone systems have implemented the transmission and switching function by means of a central time division multiplexed matrix, for interconnecting a plurality of remote telephone users and data communication devices via individual codecs over dedicated unidirectional PCM highways connected to the central switch.

The individual codecs were usually arranged in groups of 4, 8 or 12 on a printed circuit board normally referred to as a port card, and each card is plugged into a backplane printed circuit board that provides the electrical connection to the central switch.

In prior art digital telephone systems, the signaling and control function was generally provided by a central processing unit that communicated with the port cards over either a parallel microprocessor bus, or via a number of serial buses in a circuit switched mode.

A fundamental disadvantage of prior art systems which utilize a central switching matrix for transmitting signals over unidirectional PCM highways, is that the unidirectional highways are characterized by limited bandwidth. Furthermore, the backplane access of individual port cards has been found to be complex since each port card must be connected to pre-allocated ones of the PCM highways. The complex pattern of connections between the PCM highways to individual boards in such prior art systems has resulted in expensive and complicated backplane printed circuit board layout. The Principal disadvantage of implementing the signaling and control function via a prior art central processing unit is that the main processor must perform a routine port scanning function which requires a substantial amount of processor time to implement. Furthermore, prior art central controllers are typically operated under control of a predetermined main call processing software package which is required to be rewritten in the event new types and formats of port cards are introduced to the system. Also, the communication between the central controller and various ones of the port cards typically requires multiple signaling and control lines for linking individual ones of the cards to the central controller, thereby contributing to the complex backplane layout discussed above.

According to the present invention, a digital communication system is provided which utilizes distributed switching whereby a switching matrix is provided on each interface circuit for accessing a plurality of bidirectional PCM highways disposed on a universal backplane bus. The bidirectional PCM highways of the present invention provide a more efficient digital transmission system than prior art unidirectional highways since voice and data signals are transmitted directly between interface circuits instead of via a central switching matrix. The backplane access according to the present invention is simplified over prior art systems utilizing a central switch, since all port cards or interface circuits connect to the backplane in an identical manner. This results in improved flexibility over prior art systems for future applications since each card can access the full system bandwidth. Furthermore, the backplane layout of bidirectional PCM highways in accordance with the present invention is much simplified as compared to prior art unidirectional PCM highways connected to a central switch since the PCM highways of the present invention can be laid out as a parallel bus rather than routing the highway to individual boards in a complex pattern.

According to the present invention, each interface circuit is provided with local intelligence in form of a microprocessor or micro-controller linking all port cards or interface circuits together via a high-speed packet switched local area network, utilizing the backplane bus as a transmission medium. Accordingly, a system of distributed processing is provided which is characterized by the following advantages over prior art central controller based telephone system. Firstly, it relieves the main processor from the prior art requirement for routine port scanning. Secondly, it allows for the use of a high level message passing protocol, in order that new types of port cards or interface circuits can be introduced without having to rewrite the main call processing software, as in prior art systems. Furthermore, only one signaling and control line is required to link all of the port cards or interface circuits in the system, which again simplifies the backplane layout as compared to prior art systems.

In general, according to the present invention, there is provided a digital telephone system comprised of a universal backplane bus, one or more interface circuits each including control circuitry for generating and receiving message signals to and from the bus, and one or more remote peripherals connected to predetermined ones of the interface circuits, for generating and receiving information signals. Switching circuitry is provided in each of the interface circuits for effecting distributed bidirectional switching of the information signals between the remote peripherals via the bus, and communications controller circuitry is included in each of the interface circuits for exchanging the message signals between the control circuitry via the bus in accordance with a bit oriented data link protocol, in response to which the control circuitry supervises the bidirectional switching of the information signals.

Figure 2A:
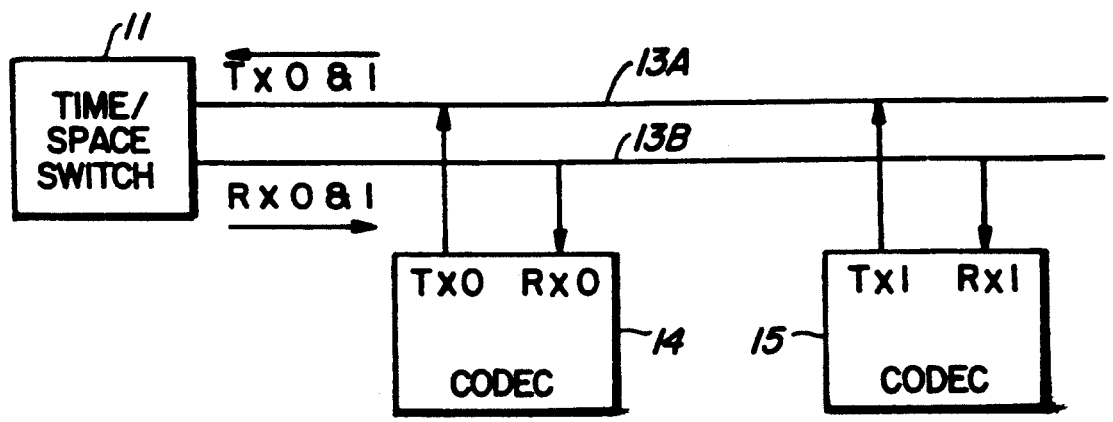
Figure 2B:
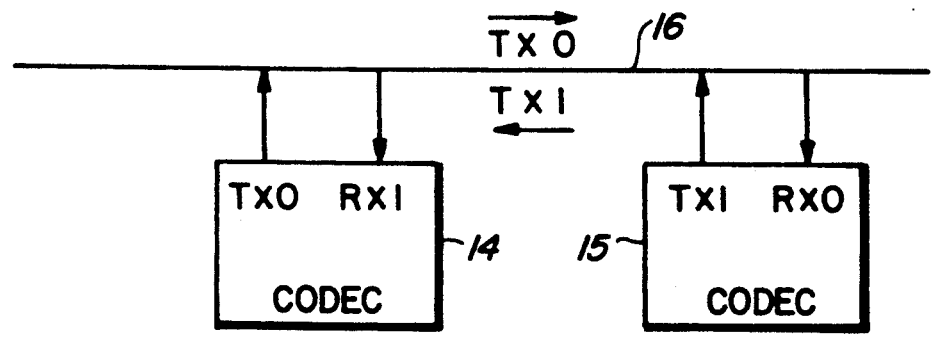
Figure 2C:
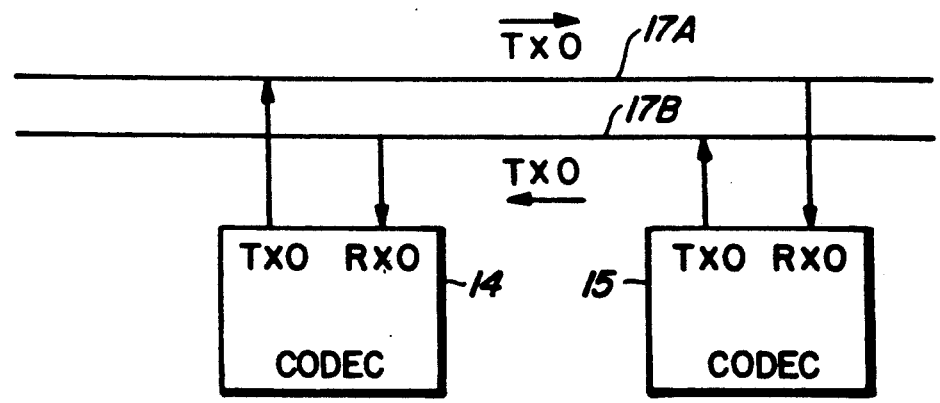
Figure 3:
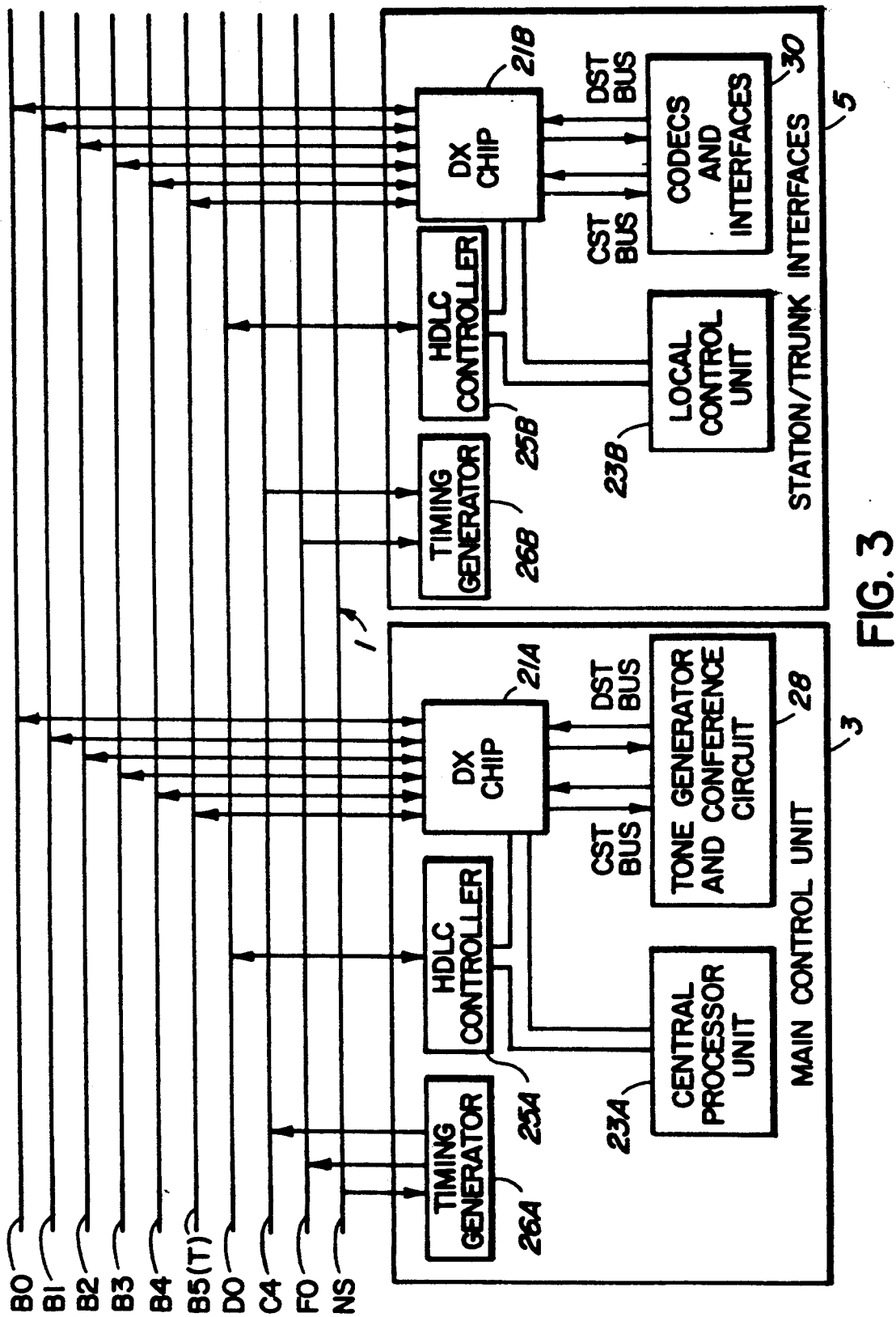
Figure 4:
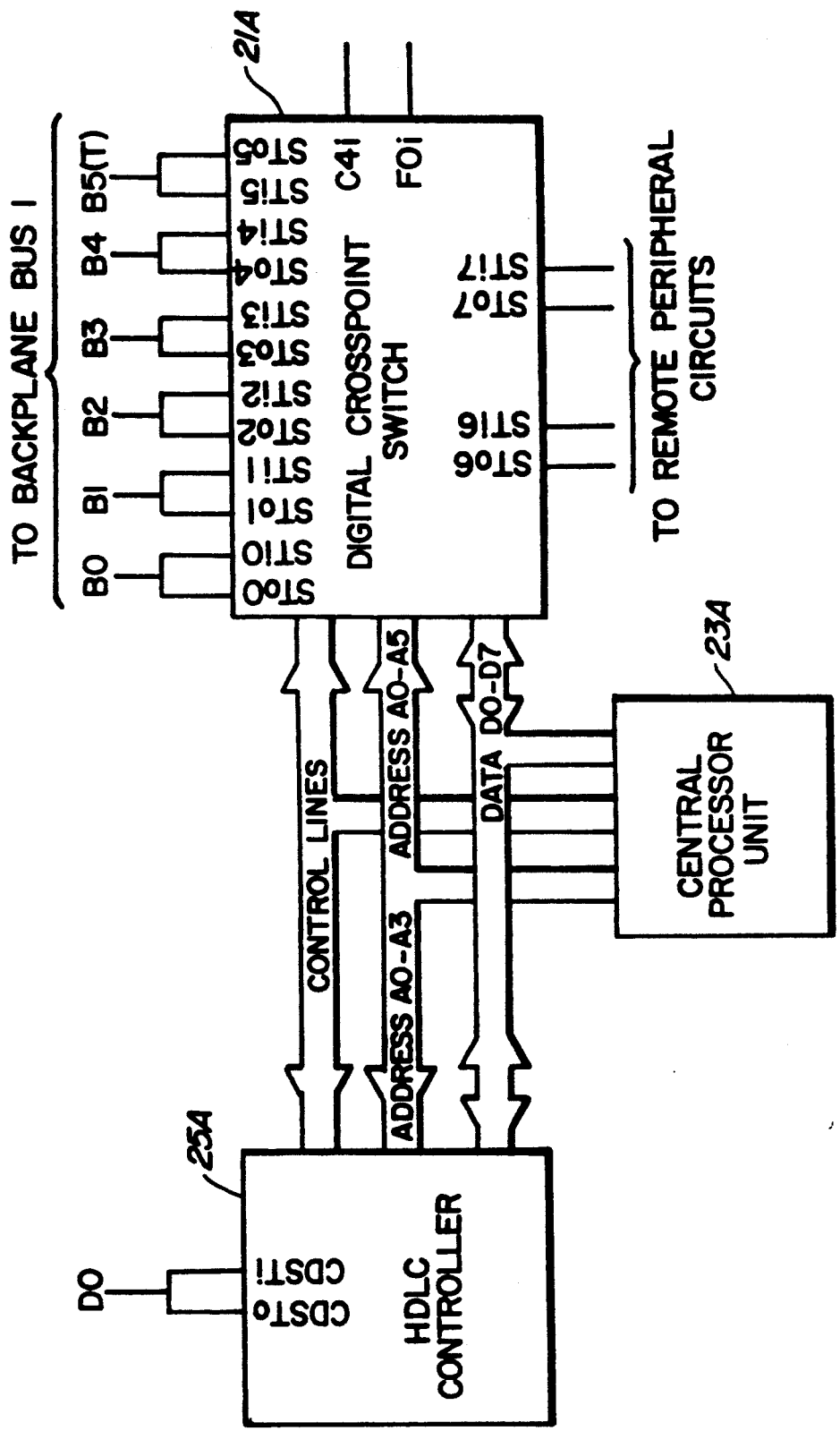

A better understanding of the present invention will be obtained with reference to the detailed description below in conjunction with the following drawings in which:

FIG. 1 is a block diagram illustrating a representative configuration of the telephone system in accordance with the present invention, FIGS. 2A-2C are block diagrams illustrating the differences between prior art unidirectional information signaling and bidirectional information signaling in accordance with the present invention, FIG. 3 is a block schematic diagram illustrating the backplane layout in accordance with a preferred embodiment of the present invention, and FIG. 4 is a schematic block diagram showing a detail of the HDLC controller, digital crosspoint switch and local control unit of an interface circuit in accordance with the preferred embodiment.

Turning to FIG. 1, a general architectural overview is provided by means of a block diagram illustrating a universal backplane bus 1 in the form of a bidirectional PCM highway connected to a plurality of interface circuits, such as main control unit 3 and various peripheral port cards (e.g. analog station/trunk card 5, ISDN port card 7 and LAN gateway card 9). Each of the interface circuits 3–9 is connected to a further message signal line 1A, which forms part of the backplane bus 1.

In operation, a plurality of remote peripherals such as subscriber sets, personal computers, attendant consoles, etc., are connected to the peripheral port card interface circuits such as analog station/trunk card 5, ISDN port card 7 and LAN gateway card 9. Each of the interface circuits 3–9 is connected in an identical manner to the universal backplane bus 1 which carries 12 megabit per second information signals between respective ones of the interface circuits 3–9. As discussed in greater detail below with reference to FIG. 3, each of the interface circuits 3–9 is further comprised of a switching matrix for effecting digital time and space switching of the information signals under the supervision of resident control circuitry. The exchange of message signals between the resident control circuitry of respective ones of the interface circuits is effected by means of the D-channel link 1A of the backplane bus 1.

As seen from FIG. 1, the interface circuits 3–9 each contains a standard backplane connection that plugs into the backplane 1, which is laid out in a parallel fashion, with all lines going to the same pin numbers on each of the interface circuits 3–9, with the exception of pins provided for carrying 5-bit identification code signals for identifying to the individual circuits 3–9 which slot of the backplane 1 the circuit has been plugged into, as discussed below.

According to a successful prototype of the present invention, only 32 pins were required for each slot to provide backplane access for each of the interface circuits 3–9. The 32 pins were laid out on a 0.2 inch×0.2 inch matrix for reducing the possibility of accidental short circuits, as follow: Pin Assignments

| PIN NUMBER | ROW "A" | ROW "C" |
|---|---|---|
| 2 | COM E | COM E |
| 4 | RNG | −40 V E |
| 6 | −34 V | −40 V |
| 8 | RR | EDR |
| 10 | C4 | SPR1 |
| 12 | FS | NS |
| 14 | D0 | D1 |
| 16 | D0 | B1 |
| 18 | B2 | B3 |
| 20 | B4 | B5(T) |
| 22 | ID0 | ID1 |
| 24 | ID2 | ID3 |
| 26 | ID4 | −5 V |
| 28 | +5 V | +5 V |
| 30 | +5 V E | −5 V E |
| 32 | COM E | COM E |

Note: E indicates extended pre-charge pin

As discussed above, and in greater detail below with reference to FIG. 3, the telephone system of the present invention utilizes bidirectional information signaling along the parallel backplane bus 1. According to the successful prototype, five bidirectional PCM data buses and a single unidirectional PCM tone bus are provided on the backplane for effecting bidirectional signal translation.

Bidirectional signal translation allows for greater bandwidth signal transmission over prior art unidirectional systems, as seen with reference to FIGS. 2A–2C.

Turning to FIG. 2A, a typical prior art unidirectional PCM transmission scheme is illustrated utilizing a central time/space switch 11 connected to a plurality of PCM links such as PCM highways 13A and 13B. PCM highway 13A carries signals received from a plurality of codecs such as codec 14 and codec 15 on pre-designated time slot channels (e.g. channel 0 from codec 14 and channel 1 from codec 15). A typical PCM communication system will utilize 32 channel PCM frames of data applied to each of the PCM highways in a cyclic recurring manner. Thus, each of the transmit and received PCM highways 13A and 13B carry 32 time slots for accomodating 16 simultaneous conversations over 32 ports (i.e. codecs). PCM information signals are generated by codec 14 during time slot 0 for reception by time/space switch 11 via transmit PCM highway 13A. Likewise, codec 14 receives from time/space switch 11 PCM information signals during time slot 0, via receive PCM highway 13B. Similarly, codec 15 receives and transmits PCM signals during time slot channel 1. In like fashion, additional codecs may be provided, in number up to 32.

Thus, a telephone system configured as in FIG. 2A, running at 2 MHZ, would be characterized by a signal bandwidth of 4 megabits per second.

Turning to FIG. 2B, a bidirectional single wire system is illustrated in which time/space switch 11 has been replaced by a predetermined time slot connection of codecs 14 and 15 to bidirectional PCM highway 16. PCM information signals transmitted during time slot 0 from codec 14 are carried by PCM highway 16 and are received by codec 15 during the same time slot. Likewise, codec 15 generates and applies PCM signals to the highway 16 during time slot channel 1 for reception by codec 14. In this way, a conversation is established between codecs 14 and 15 utilizing the single wire highway 16, without requiring a dedicated central switching matrix. In this manner, up to 16 conversations between 32 ports (i.e. codecs) may be accomodated utilizing a single wire PCM highway 16. The system of FIG. 2B is characterized by a bandwidth capability of 2 megabits per second yet utilizes only one wire as opposed to the 2-wire system of FIG. 2A, and eliminates the neccessity for time/space switch 11. Furthermore, the number of ports which can be accomodated by the system of FIG. 2B, is doubled over the prior art system of FIG. 2A.

FIG. 2C illustrates a 2-wire bidirectional system in which codecs 14 and 15 are connected to a pair of bidirectional PCM highways 17A and 17B. According to the system of FIG. 2C, each of the codecs 14 and 15 generates and receives PCM signals on the shared time slot 0, for carrying on a conversation. Thus, according to the 2-wire bidirectional system of FIG. 2C, up to 32 conversations may be carried on between 64 ports over 32 time slots, with a bandwidth of 4 megabits per second. Accordingly, the port handling capability of the 2-wire bidirectional system of FIG. 2C is exactly twice that of the prior art unidirectional system shown in FIG. 2A.

In order to implement the bidirectional PCM signal transmission systems of either FIG. 2B or 2C, each of the codecs 14 and 15 must be provided with circuitry for selectively enabling transmission and reception of PCM signals via the individual codecs during the predetermined time slot channels.

According to the present invention, such time slot allocation circuitry is provided by means of a digital crosspoint switch, as shown in detail with reference to FIGS. 3 and 4. In particular, a preferred embodiment of the present invention is shown with reference to FIG. 3 in which PCM bus 1 is comprised of a plurality of bidirectional PCM highways B0-B4, a unidirectional tone bus B5(T), a bidirectional data lead DO and a plurality of timing leads C4, F0 and NS. Each of the interface circuits 3 and 5 is shown comprised of a digital crosspoint switching matrix (i.e. DX chip 21A and 21B), control circuitry (i.e. central processor unit 23A and local control unit 23B), a communication controller (i.e. HDLC controllers 25A and 25B) and timing generators 26A and 26B. Four unidirectional ST buses (e.g. CST and DST) are connected between the digital crosspoint switching circuits 21A and 21B and respective ports, such as tone generator and conference circuit 28 in main control unit 3 and the codecs and interface circuitry 30 within station/trunk interface 5.

All of the PCM buses are run at a data rate of preferably 2.048 megabits per second resulting in a total backplane PCM bandwidth of 10.24 megabits per second, which provides a total non-blocking system capacity of 160 voice-only ports, or 80 voice/data (ISDN) ports.

The on-board control circuitry (e.g. local control unit 23B and central processor unit 23A) provide microprocessor controlled local intelligence. Individual control circuitry of the respective interface circuits communicate with each other over the 2.048 megabit per second packet switched local area network provided by data lead DO and HDLC controllers 25A and 25B.

In order to better understand the present invention, a typical scenario will be described with reference to FIGS. 1 and 3, for illustrating a normal call sequence in accordance with the present invention.

For example, a remote user of a digital subscriber set (not shown) connected to ISDN port card 7 may go off-hook. The off-hook condition is detected by the local control unit of ISDN port card 7, which in response formulates a message signal for transmission via the associated HDLC controller for reception by main control unit 3, in order to indicate to the main control unit 3 which one of the remote peripherals has gone off-hook.

Meanwhile, tone generator 28 of main control unit 3 is constantly generating and applying dial tone and other supervisory tones during respective time slot channels on unidirectional tone bus B5(T). The ISDN port card 7 extracts the dial tone signal from bus B5(T) via the associated digital switching circuit disposed thereon. The dial tone signal is then transmitted to the remote digital subscriber set (not shown) in a well known manner.

In response to dialing predetermined digits at the remote digital subscriber set, ISDN port card 7 transmits dialling digit information via backplane bus 1 for reception by main control unit 3. In the event that the central processor unit 23A of main control unit 3 detects a valid telephone number as identified by the dialling digits, the central processor unit 23A formulates and generates a message signal to station/trunk interface circuit 5 for establishing a connection in accordance with call processing software and transmits dial digit information via HDLC controller 25A and data lead DO to a predetermined idle trunk circuit connected to one of the codecs and interfaces 30. The call processing software may also implement such features as least cost routing, long distance inhibit, etc. The central processor unit 23A of main control unit 3 contains a memory map of available time slots within respective ones of the digital switches associated with interface circuits 3-9. The available time slots may be pre-selected for individual ones of the codecs 30, tone generator and conference circuit 28, or other peripheral interfaces since dynamic time slot assignment is not required in accordance with the present invention due to its non-blocking configuration.

Thus, central processor unit 23A generates message signals to station/trunk interface circuit 5 as well as ISDN port card 7 for allocating predetermined time slots within the associated digital switching circuits in order to establish a communication channel via a predetermined one of the bidirectional signals buses B0-B4, between the remote digital subscriber set connected to ISDN port card 7 and the remote trunk circuit connected to analog station/trunk card 5. Each of the digital switching circuits 21A, 21B, etc., includes 256 memory locations which are split between the backplane buses B0-B4 and B5(T) and the CST and DST buses connected to the remote peripherals.

Thus, a conversation path is established by means of the circuitry shown in FIGS. 1 and 3 between a first remote peripheral such as a digital subscriber set connected to ISDN port card 7 and a second remote peripheral, which in this case is a remote trunk circuit connected to analog station/trunk card 5. Additional connections between a remote party and the trunk circuit are effected in a well known manner.

Turning to FIG. 4, a schematic block diagram is shown illustrating the HDLC controller 25A and digital crosspoint switching circuit 21A of the main controller connected to the central processor unit 23A. Of course, the configuration of HDLC controller, digital crosspoint switching circuit and control circuitry of FIG. 4 is implemented on each of the interface circuits 3-9, resulting in generic access to the universal backplane, as discussed above.

According to the successful prototype shown in FIG. 4, the HDLC controller 25A was implemented utilizing a MT8952B HDLC protocol controller and the digital crosspoint switching circuit 21A was implemented utilizing a model MT8980D crosspoint switching circuit, both manufactured by Mitel Corporation.

In summary, the system architecture in accordance with the present invention is based on a flexible, wide bandwidth backplane with universal slots. Any card (i.e. interface circuits 3-9) may be plugged into any slot on the backplane, and each card has access to the full system bandwidth. The backplane is preferably configured as one or more modules that can be expanded to a maximum of 32 slots. The system in accordance with the present invention utilizes distributed processing as well as distributed switching, for facilitating use of the universal backplane. The disadvantages associated with prior art central processing and central switching systems are overcome by the system of the present invention, as discussed in detail above.

A person understanding the present invention may conceive of other embodiments or variations therein.

For example, the data rate of PCM signals carried by the backplane bus 1 may be increased from 2.048 megabits per second in the preferred embodiment to 4.096 megabits per second or greater. This would increase the system non blocking capacity to upwards of 320 analog voice only ports or 160 voice/data (ISDN) ports. This modification would be easy to achieve since the only significant change would be to double the bit rate capacity of the digital crosspoint switch utilized in each of the interface circuits.

Other applications of the present invention are possible in connection with high capacity data only PABXs, or T1 digital trunk multiplexers, etc.

Also, whereas the block diagram of FIG. 1 illustrates a representative configuration of interface circuits, many other combinations of interface circuits are possible. For example, T1 digital trunk cards, miscellaneous alarms cards, etc. may be advantageously incorporated into the system of the present invention.

These and other embodiments or modifications are believed to be within the sphere and scope of the present invention as defined by the claims appended hereto.

The embodiments of the invention which an exclusive property or privilege is claimed are defined as follows:

1. A digital communication system, comprised of:
   (a) a universal backplane bus,
   (b) plural interface circuits each including control means for generating and receiving message signals to and from said bus,
   (c) one or more remote peripherals connected to predetermined ones of said interface circuits, for generating and receiving information signals,
   (d) switching means included in each of said interface circuits for effecting distributed bidirectional switching of said information signals between said remote peripherals via said bus,
   (e) communication controller means included in each of said interface circuits for exchanging said message signals between said control means via said bus in accordance with a bit oriented data link protocol, in response to which said control means supervises said bidirectional switching of said information signals, and
   (f) one of said interface circuits including means for storing a memory map of available time slots within respective ones of said switching means and for generating and transmitting message signals to said switching means for controlling which time slots are to be used for interchange of said information signals via said bus, whereby said supervision of said bidirectional switching of said information signals by said control means can be initiated, and a flexible data bus time slot assignment obtained.

2. A digital communication system as defined in claim 1, wherein at least one of said interface circuits includes one or more codecs connected to said remote peripherals and said switching means for receiving said information signals from said remote peripherals in analog format and converting the analog format signals to digital format and transmitting the digital format signals to said switching means, and for receiving the digital format signals from said switching means and converting the digital format signals to said analog format and transmitting to said peripherals.

3. A digital communication system as defined in claim 2, wherein at least one of said interface circuits includes a tone generator and tone detection circuitry connected to said switching means, for generating predetermined tone signals for transmission to said remote peripherals via said switching means and said bus, and for receiving and detecting additional tone signals generated by said remote peripherals.

4. A digital communication system as defined in claim 1, 2 or 3, wherein said bit oriented protocol is HDLC protocol.

5. A digital communication system as defined in claim 1, 2 or 3, wherein said switching means is comprised of a time and space digital switch.

6. A digital communication system as defined in claim 1, 2 or 3, wherein at least one of said interface circuits is comprised of an ISDN port card for supporting ISDN communication of said information signals between respective ones of said remote peripherals.

7. A digital communication system as defined in claim 1, 2 or 3, wherein at least one of said interface circuits is comprised of a local area network gateway card for supporting communication of said information signals between predetermined ones of said remote peripherals and a local area network.

8. A digital communication system as defined in claim 1, 2 or 3, wherein said bus is comprised of five bidirectional PCM links connected to said switching means for carrying said information signals transmitted at a rate of approximately 2 MHz, thereby resulting in a signal bandwidth on said bus in excess of 10 Mbs, and a port handling capability of over 160 analog ports or 80 ISDN ports.

9. A digital communication system as defined in claim 1, 2 or 3, wherein said bus is comprised of five bidirectional PCM links connected to said switching means for carrying said information signals transmitted at a rate of approximately 4 MHz, thereby resulting in a signal bandwidth on said bus in excess of 20 Mbs, and a port handling capability of over 320 analog ports or 160 ISDN ports.

10. A digital communication system as defined in claim 1, 2 or 3, wherein at least one of said interface circuits is comprised of a T1 digital trunk card for multiplexing and exchanging digital voice and data signals between said system and a digital trunk.

11. A digital communication system, comprised of:
   (a) a universal backplane bus,
   (b) plural interface circuits each including control means for generating and receiving message signals to and from said bus,
   (c) one or more remote peripherals connected to predetermined ones of said interface circuits, for generating and receiving information signals,
   (d) switching means included in each of said interface circuits for effecting distributed bidirectional switching of said information signals between said remote peripherals via said bus,
   (e) communication controller means included in each of said interface circuits for exchanging said message signals between said control means via said bus in accordance with a bit oriented data link protocol, in response to which said control means supervises said bidirectional switching of said information signals, and
   (f) central means for determining idle time slots which may exist in said switching means and indicating to said control means vacant channels to control said switching means to use to effect interchange of said information signals by said bidirectional switching.

* * * * *